United States Patent
Park et al.

(10) Patent No.: US 12,255,357 B2
(45) Date of Patent: *Mar. 18, 2025

(54) BATTERY CELL HAVING ASYMMETRIC ELECTRODE LEADS, AND BATTERY MODULE COMPRISING SAME AND HAVING REINFORCED MECHANICAL STRENGTH

(71) Applicant: LG ENERGY SOLUTION, LTD., Seoul (KR)

(72) Inventors: Jhin Ha Park, Daejeon (KR); Jin Yong Park, Daejeon (KR); Jeong Oh Moon, Daejeon (KR); Hee Jun Jin, Daejeon (KR); Ho June Chi, Daejeon (KR); Kyung Woo Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 540 days.

This patent is subject to a terminal disclaimer.

(21) Appl. No.: 17/634,427

(22) PCT Filed: Jul. 1, 2021

(86) PCT No.: PCT/KR2021/008316
§ 371 (c)(1),
(2) Date: Feb. 10, 2022

(87) PCT Pub. No.: WO2022/055096
PCT Pub. Date: Mar. 17, 2022

(65) Prior Publication Data
US 2022/0271396 A1 Aug. 25, 2022

(30) Foreign Application Priority Data
Sep. 8, 2020 (KR) .................. 10-2020-0114877

(51) Int. Cl.
*H01M 50/51* (2021.01)
*H01M 50/105* (2021.01)
(Continued)

(52) U.S. Cl.
CPC ......... *H01M 50/51* (2021.01); *H01M 50/105* (2021.01); *H01M 50/211* (2021.01);
(Continued)

(58) Field of Classification Search
None
See application file for complete search history.

(56) References Cited

U.S. PATENT DOCUMENTS 10,991,973 B2    4/2021   Lee et al.
2007/0059593 A1* 3/2007   Kim ............... H01M 50/227
                                                      429/162
(Continued)

FOREIGN PATENT DOCUMENTS

CN    110336070       * 10/2019
CN    110336070 A      10/2019
(Continued)

OTHER PUBLICATIONS

Machine translation of KR20060134549, Dec. 2006.*
(Continued)

*Primary Examiner* — Jonathan Crepeau
(74) *Attorney, Agent, or Firm* — Birch, Stewart, Kolasch & Birch, LLP

(57) ABSTRACT

A battery cell has asymmetrically formed electrode leads, and a battery module including the same. The spatial efficiency and the mechanical strength of the battery module are improved.

10 Claims, 5 Drawing Sheets

(51) Int. Cl.
  *H01M 50/211* (2021.01)
  *H01M 50/242* (2021.01)
  *H01M 50/264* (2021.01)
  *H01M 50/289* (2021.01)
  *H01M 50/291* (2021.01)
  *H01M 50/548* (2021.01)

(52) U.S. Cl.
  CPC ....... *H01M 50/242* (2021.01); *H01M 50/289* (2021.01); *H01M 50/291* (2021.01); *H01M 50/548* (2021.01); *H01M 50/264* (2021.01); *H01M 2220/30* (2013.01)

(56) References Cited

U.S. PATENT DOCUMENTS

| | | |
|---|---|---|
| 2012/0261206 A1 | 10/2012 | Yasui et al. |
| 2013/0052516 A1 | 2/2013 | Kim |
| 2015/0079455 A1 | 3/2015 | Chang et al. |
| 2015/0086845 A1 | 3/2015 | Chang et al. |
| 2017/0012315 A1 | 1/2017 | Kayano et al. |
| 2021/0164511 A1 | 6/2021 | Jeong et al. |
| 2021/0194061 A1 | 6/2021 | Kotik et al. |
| 2021/0351463 A1 | 11/2021 | Park et al. |

FOREIGN PATENT DOCUMENTS

| | | |
|---|---|---|
| CN | 209981395 U | 1/2020 |
| CN | 210778687 U | 6/2020 |
| JP | 2007-103344 A | 4/2007 |
| JP | 2009-507339 A | 2/2009 |
| JP | 2009-110812 A | 5/2009 |
| JP | 2011-171176 A | 9/2011 |
| JP | 2016-530693 A | 9/2016 |
| JP | 2016-534530 A | 11/2016 |
| JP | WO2015/121926 A1 | 3/2017 |
| JP | 2011-210582 A | 12/2024 |
| KR | 10-2006-0134549 A | 12/2006 |
| KR | 10-2011-0105737 A | 9/2011 |
| KR | 10-2012-0102694 A | 9/2012 |
| KR | 10-2013-0021135 A | 3/2013 |
| KR | 10-2014-0110132 A | 9/2014 |
| KR | 10-2016-0108116 A | 9/2016 |
| KR | 10-2018-0088093 A | 8/2018 |
| KR | 10-2018-0124093 A | 11/2018 |
| WO | WO 2007/027058 A1 | 3/2007 |
| WO | WO 2019/103344 A1 | 5/2019 |
| WO | WO 2018/202960 A1 | 10/2019 |
| WO | WO 2020/138821 A1 | 7/2020 |

OTHER PUBLICATIONS

Japanese Office Action for Japanese Application No. 2022-510188, dated Mar. 13, 2023, with an English translation.
Japanese Notice of Allowance for Japanese Application No. 2022-510188, dated Jul. 31, 2023, with an English translation.
Extended European Search Report for European Application No. 21854855.0, dated Jan. 31, 2023.

* cited by examiner

[FIG. 1]
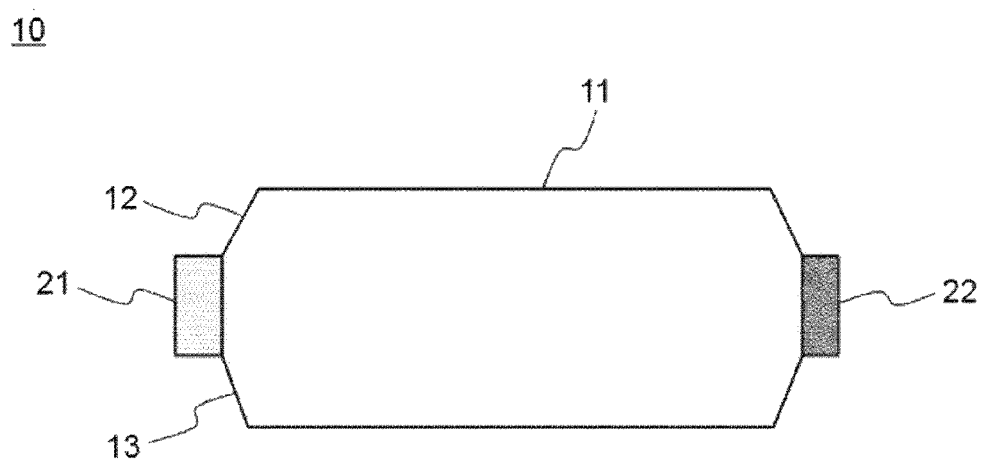
Prior Art

[FIG. 2]
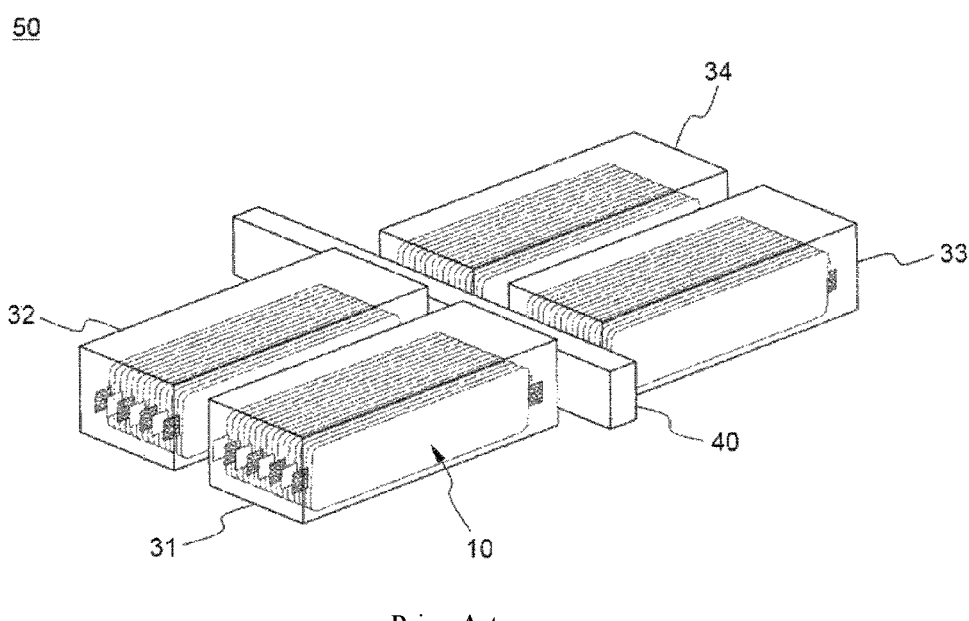
Prior Art

[FIG. 3]
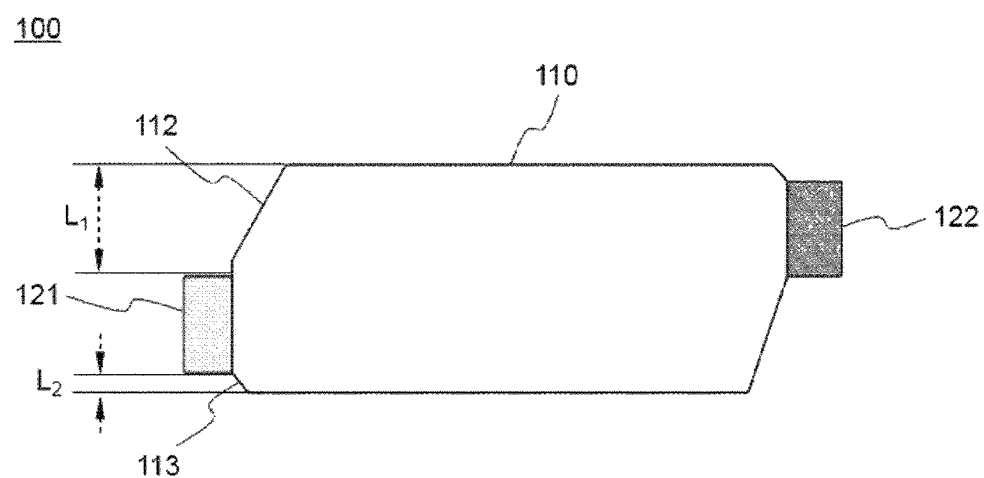

[FIG. 4]
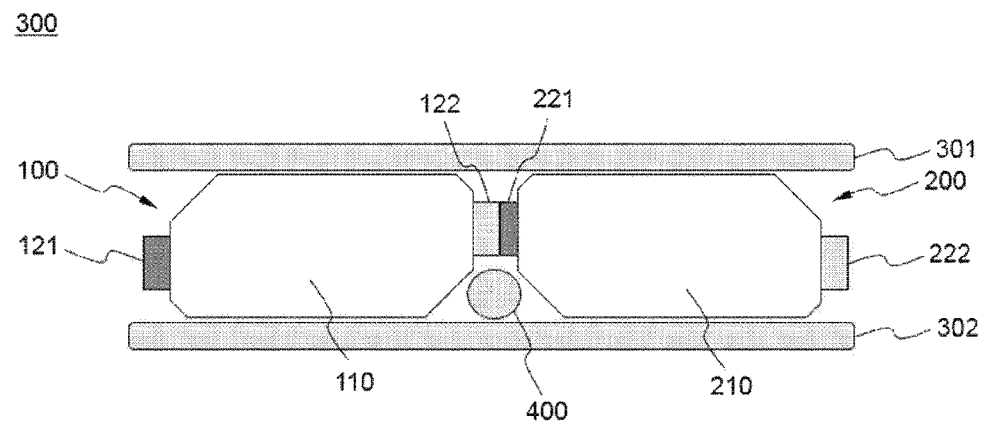

[FIG. 5]
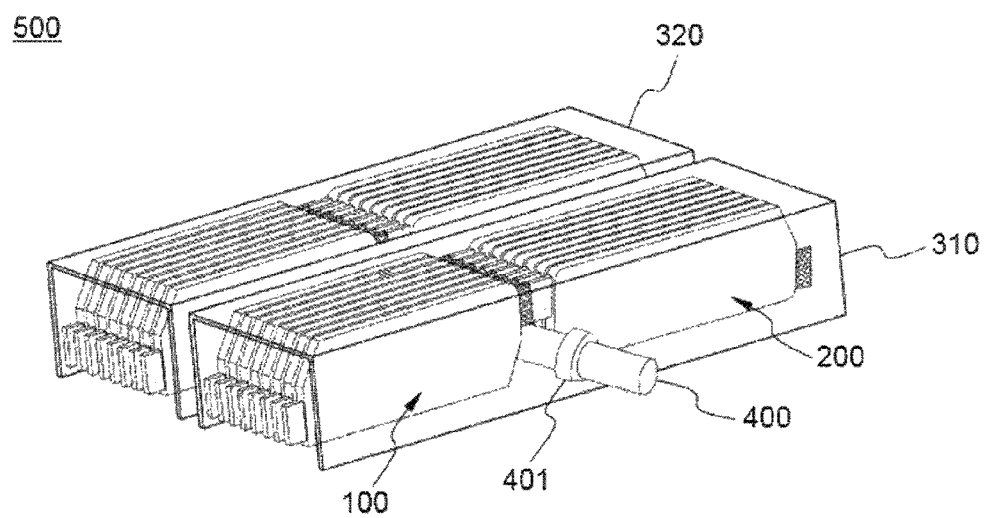

BATTERY CELL HAVING ASYMMETRIC ELECTRODE LEADS, AND BATTERY MODULE COMPRISING SAME AND HAVING REINFORCED MECHANICAL STRENGTH

TECHNICAL FIELD

This application claims the benefit of priority based on Korean Patent Application No. 10-2020-00114877, filed on Sep. 8, 2020, and the entire contents of the Korean patent application are incorporated herein by reference.

The present invention relates to a battery cell having electrode leads formed in an asymmetric structure, and a battery module with improved mechanical strength including the same.

BACKGROUND ART

In recent years, as the price of energy sources increases due to the depletion of fossil fuels and the interest of environmental pollution is amplified, the demand for environmentally friendly alternative energy sources has become an indispensable factor for future life. As such, various researches on power generation technologies such as nuclear power, solar power, wind power, and tidal power have been continued, and electric power storage devices for more efficient use of such generated energy have also been attracting much attention.

In particular, with the development of technology and demand for mobile devices, the demand for batteries as energy sources is rapidly increasing, and accordingly, a lot of researches on batteries capable of meeting various demands have been conducted.

Typically, in terms of the shape of the battery, there is a high demand for a pouch-type secondary battery that can be applied to products such as mobile phones with a small thickness. In terms of materials, there is a high demand for lithium secondary batteries such as lithium ion batteries and lithium ion polymer batteries having advantages such as high energy density, discharge voltage, and output stability.

Such a pouch-type battery is formed in a structure such that an electrode assembly including a positive electrode, a negative electrode, and a separator disposed therebetween is built in a case, and positive and negative electrode tabs are respectively joined to electrode leads and are sealed to be exposed to the outside of the case. The electrode leads are electrically connected to the external device through contact with the external device, and the battery supplies power to the external device through the electrode leads or receives power from the external device.

However, when a battery module is formed by combination of a plurality of battery cells, a pouch-type battery has a limitation that the spatial efficiency is not good due to the protruding electrode lead, a terrace region formed during the sealing process, etc. Further, a separate space for forming a reinforcing bar is required to improve the mechanical strength of a battery module.

FIG. 1 shows a conventional battery cell. As illustrated in FIG. 1, the conventional pouch-type battery cell has a structure where a first electrode lead 21 and a second electrode lead 22 protrude at two side surfaces on the basis of the cell body 11 having an electrode assembly. Specifically, the side surface, where the first electrode lead 21 of the cell body 11 is formed, has a structure having shoulder lines 12 and 13, in which the height of the cell body 11 gradually decreases toward the external ends in the width direction of the battery cell 10 on the basis of the first electrode lead 21. Further, shoulder lines are also formed in both width directions based on the second electrode lead 22.

FIG. 2 shows a structure in which a battery pack 50 is formed by combining the battery cells 10 shown in FIG. 1. Referring to FIG. 2, 4 battery modules 31, 32, 33 and 34, where a multiple of battery cells 10 are accommodated, are combined to form one battery pack 50. In this case, a reinforcing bar 40 is formed to increase the mechanical strength inside the battery pack 50. The reinforcing bar 40 is formed at a position across a space between battery modules 31 and 32 located on the left side and battery modules 33 and 34 located on the right side. The conventional battery pack 50 requires a separate space for forming this reinforcing bar 40, which lowers the space utilization rate.

Therefore, a new technology for improving mechanical strength while increasing the spatial efficiency at the time of assembling a battery pack is required.

PRIOR ART LITERATURE

Patent Document (Patent Document 1) Korean Patent Publication No. 2019-0069873

DISCLOSURE

Technical Problem

The present invention has been devised to solve the above problems of the prior art, and an object of the present invention is to provide a technology for improving mechanical strength while increasing the spatial efficiency in the process of forming a battery module using pouch-type battery cells.

Technical Solution

The present invention provides a battery cell having electrode leads formed in an asymmetric structure. In one example, a battery cell according to the present invention is a pouch-type battery cell and includes: a cell body for accommodating an electrode assembly; a first electrode lead protruding in a first direction of the cell body; and a second electrode lead protruding in a second direction opposite to the first, wherein the first electrode lead forms a dead space on a first side surface by being closer to a top side of the cell body, and wherein the second electrode lead forms a dead space on a second side surface by being closer to bottom side of the cell body.

In one example, each side of the cell body has two shoulder lines, and the shoulder lines are angled relative to the bottom side and top side of the cell body.

In a specific example, a ratio of lengths of the shoulder lines is in a range of 1:2 to 1:10.

The present invention provides a battery module including a cell laminate obtained by lamination of a plurality of battery cells described above. In one example, the battery module according to the present invention includes: a cell laminate obtained by lamination of a plurality of battery cells; a housing for accommodating the cell laminate; and a reinforcing pole which penetrates the battery cell laminate. Further, the cell laminate has m battery cells arranged in an x-axis direction, and n battery cells arranged in a y-axis direction, wherein the m is an integer of 2 or more, wherein the n is an integer of 2 or more. Herein, the reinforcing pole penetrates a dead space between the battery cells arranged in the x-axis direction.

In a specific example, in the battery module according to the present invention, the battery cells arranged in the x-axis direction have a second electrode lead of a p-th battery cell contact a first electrode lead of a (p+1)-th battery cell to thereby be electrically connected in series, wherein p is an integer which is equal to or greater than 1 and equal to or less than m−1.

In another specific example, the reinforcing pole penetrates a dead space between a p-th battery cell and a (p+1)-th battery cell.

For example, the cell laminate has a structure in which 2 to 4 battery cells are arranged in the x-axis direction, and 10 to 30 battery cells are arranged in the y-axis direction.

In one example, the housing has a receiving portion for accommodating the cell laminate and a through hole at each of side surfaces of the housing.

In a specific example, a cross-section of the reinforcing pole has a circular or elliptical shape, and at least one stopper is formed in at least one of an inner side or an external side of one of the holes of the housing, through which the reinforcing pole penetrates.

In further another specific example, the housing includes: a U-shaped frame including a receiving portion for accommodating the cell laminate; and a top plate which covers an upper surface of the U-shaped frame, the through holes being formed at side surfaces of the U-shaped frame, wherein the reinforcing pole penetrates the through holes.

In further another specific example, the housing includes: a bottom plate which supports the cell laminate from a lower portion; and a U-shaped frame which covers the cell laminate located on the bottom plate, the through holes being formed at side surfaces of the U-shaped frame, wherein the reinforcing pole penetrates the through holes.

For example, the battery module further includes an end plate which covers at least one side surface of the U-shaped frame.

Advantageous Effects

According to battery cells and a battery module including the same of the present invention, a battery module is formed by using pouch-type battery cells, and it possible to improve mechanical strength while maintaining excellent spatial efficiency.

BRIEF DESCRIPTION OF THE DRAWINGS

FIG. 1 is a schematic diagram showing a conventional battery cell.

FIG. 2 is a schematic diagram showing a conventional battery module.

FIG. 3 is a schematic diagram showing a battery cell according to one embodiment of the present invention.

FIG. 4 is a schematic diagram showing a cross-sectional structure of a battery module according to another embodiment of the present invention.

FIG. 5 is a schematic diagram showing a structure of a battery pack according to another embodiment of the present invention.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In general, in pouch-type battery cells, a dead space is generated due to formation of electrode leads, which lowers the spatial efficiency. The present invention provides battery cells of a new structure capable of a dead space according to formation of electrode leads. The present invention provides battery cells, specifically pouch-type battery cells having first and second electrode leads formed in an asymmetric structure.

In one embodiment, a pouch-type battery cell according to the present invention includes: a cell body for accommodating an electrode assembly; a first electrode lead which is formed in a manner that protrudes in one direction of the cell body; and a second electrode lead which is formed in a manner that protrudes in a direction opposite to a direction in which the first electrode lead of the cell body is formed. Specifically, the electrode assembly includes a positive electrode, a negative electrode, and a separator interposed between the positive electrode and the negative electrode. Further, the pouch-type battery cell has a structure where an electrode assembly is sealed by a pouch-type case, and first and second electrode leads protrude in opposite directions.

Further, in the pouch-type battery cell, the first electrode lead forms a dead space on one side surface by being leaned to the other side surface direction, on a basis of a central axis in a longitudinal direction of the battery cell. At the same time, the second electrode lead forms a dead space on one side surface by being leaned to an opposite direction of that of the first electrode lead, on a basis of the central axis in the longitudinal direction of the battery cell. The conventional battery cells have a symmetric structure where electrode leads are respectively formed on the central portion of one side surface and the other side surface, but the pouch-type battery cell according to the present invention has an asymmetric structure where respective electrode leads are leaned in one direction, and the first and second electrode leads are leaned in opposite directions.

In one example, the cell body has a structure in which heights of shoulder lines decrease toward external ends in a width direction, based on the first and second electrode leads. The heights of the shoulder lines decrease toward the external ends from the electrode lead, and the heights may sequentially or continuously decrease. For example, the first electrode lead is leaned to the left side, and in this case, the shoulder line at the right side is long, and the shoulder line at the left side is short. The shoulder line formed at the right side may have a straight line structure having a section where the height gradually decreases, and the shoulder line formed at the left side may have a curved line structure of a convex shape, having a section where the height decreases.

In a specific example, a ratio of lengths of the shoulder lines, which are formed at both sides of the first and second electrode leads in the width direction, respectively, is in a range of 1:2 to 1:10. Specifically, in the cell body, the ratio of width direction lengths of shoulder lines formed at both sides in the width direction on the basis of the first and second electrode leads may be in a range of 1:2 to 1:10, 1:3 to 1:10, 1:5 to 1:10, or 1:3 to 1:6. For example, the first electrode lead is leaned to the left side, and in this case, the shoulder line at the right side is long, and the shoulder line at the left side is short. In this case, the shoulder line formed at the left side needs to have the minimum width for sealing the edge portion, and the shoulder line formed at the right side has a wide width to secure a sufficient dead space.

In addition, the present invention may provide a battery module including the battery cell described above. The battery cell is, for example, a pouch-type battery cell, and has a structure where first and second electrode leads asymmetrically protrude in two directions. In one example, the battery module according to the present invention includes: a cell laminate obtained by lamination of a plurality of battery cells; a housing for accommodating the battery cell laminate; and a reinforcing pole which penetrates the battery cell laminate. The cell laminate has a structure in which m battery cells are arranged in an x-axis direction, and n battery cells are arranged in a y-axis direction. Herein, the m is an integer of 2 or more, and the n is an integer of 2 or more. Further, the reinforcing pole penetrates a dead space between the battery cells arranged in the x-axis direction.

The present invention relates to a battery module which is formed by combination of battery cells having a structure in which heights of shoulder lines decrease toward external ends in a width direction, based on the first and second electrode leads. The battery module forms a reinforcing pole to reinforce the mechanical strength. At this time, the reinforcing pole is positioned to penetrate the dead space of battery cells. Therefore, the battery module according to the present invention does not require a separate additional space for forming a reinforcing pole.

In a specific example, in the battery module, the battery cells arranged in the x-axis direction have a structure in which a second electrode lead of a p-th battery cell contacts a first electrode lead of a (p+1)-th battery cell to thereby be electrically connected in series, wherein the p is an integer which is equal to or greater than 1 and equal to or less than m−1. Specifically, the battery cells disposed in the x-axis direction are electrically connected in series and satisfy the voltage level required in the battery module. For example, a p-th battery cell is disposed so that the second electrode lead is leaned to the upper side based on the vertically accommodated position, and a (p+1)-th battery cell is disposed so that the first electrode lead is also leaned to the upper side. In this case, the second electrode lead of the p-th battery cell and the first electrode lead of the (p+1)-th battery cell face each other at the same height, and two electrode leads contact each other and are electrically connected in series.

Further, an empty space for allowing the reinforcing pole to pass while dead spaces of the two battery cells meet is formed at the lower side of a point where the second electrode lead of the p-th battery cell and the first electrode lead of the (p+1)-th battery cell contact. The reinforcing pole is arranged to penetrate a dead space between a p-th battery cell and a (p+1)-th battery cell. Herein, the p is an integer which is equal to or greater than 1 and equal to or less than m−1. Further, battery cells disposed in the y-axis direction are disposed so that the first and second electrode leads are arranged at the same height and in the same direction.

In one embodiment, the cell laminate has a structure in which 2 to 10 battery cells are arranged in an x-axis direction, and 5 to 50 battery cells are arranged in a y-axis direction. Specifically, the cell laminate has a structure in which 2 to 4 battery cells are arranged in an x-axis direction, and 10 to 30 battery cells are arranged in a y-axis direction. The number of battery cells accommodated in the battery module is derived by multiplying the number of battery cells disposed in the y-axis direction by the number of battery cells disposed in the x-axis direction. For example, the battery module according to the present invention may have a structure containing 48 battery cells, where 2 battery cells are disposed in the x-axis direction, and 24 battery cells are disposed in the y-axis direction.

The battery module according to the present invention has a structure in which a cell laminate is accommodated in the housing. In one example, the housing has a receiving portion for accommodating the cell laminate and has a through hole at each of side surfaces of the housing. The reinforcing pole has a structure that penetrates the housing, which enhances the mechanical strength of the battery module.

In a specific example, a cross-section of the reinforcing pole has a circular or elliptical shape, and at least one stopper is formed in at least one of an inner side or an external side of a hole of the housing, through which the reinforcing pole penetrates. In the present invention, the case in which the cross-section of the reinforcing pole is a quadrangle is not excluded. However, when considering the spatial efficiency and the point that the reinforcing pole should be accommodated in the dead space between the battery cells, the cross-section of the reinforcing pole preferably has a circular or elliptical shape.

In the present invention, the shape of the housing is not particularly limited as long as it effectively accommodates the cell laminate. In one embodiment, the housing includes: a U-shaped frame including a receiving portion for accommodating the cell laminate; and a top plate which covers an upper surface of the U-shaped frame, wherein through holes, through which the reinforcing pole penetrates, are formed at both side surfaces of the U-shaped frame. The housing may also have a quadrangle structure where 4 surfaces are closed, based on the cross-sectional structure. Herein, the housing can be easily assembled and transported by forming a structure that accommodates a cell laminate in a U-shaped frame located at the lower portion and covers the upper portion with the top plate.

In further another example, the housing includes: a bottom plate which supports the cell laminate from a lower portion; and a U-shaped frame which covers the cell laminate located on the bottom plate, wherein through holes, through which the reinforcing pole penetrates, are formed at both side surfaces of the U-shaped frame. In this case, the cell laminate is positioned on the bottom plate, which is covered by the U-shaped frame.

Further, the battery module according to the present invention further includes an end plate covering the side surface of the U-shaped frame, if necessary. In one embodiment, the battery module further includes an end plate which covers at least one side surface among both side surfaces of the U-shaped frame. The end plate fixes the accommodated cell laminate, and a structure where an electrode lead is electrically connected to the outside, for example, a bus bar, etc. is formed.

Further, the present invention provides a battery pack including a battery module described above. In a specific example, the battery pack according to the present invention includes one or more battery modules. The battery pack is applicable to various types of energy storage devices and power sources. For example, the energy storage device is an Energy Storage System (ESS) that stores a large amount of electrical energy. In addition, the power source is applicable to the power source of a moving means such as a vehicle. The vehicle refers to any type of vehicle which uses secondary batteries as its auxiliary power source or main power source. Specifically, the vehicle includes a hybrid (HEV), a plug-in hybrid (PHEV), or a pure electric car (BEV, EV), and the like.

DETAILED DESCRIPTION OF THE PREFERRED EMBODIMENTS

Hereinafter, the present invention will be described in more detail through drawings and examples. As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

First Embodiment

FIG. 3 is a schematic view of a battery cell according to an embodiment of the present invention. Referring to FIG. 3, the battery cell 100 according to the present invention is a pouch-type battery cell 100 having a structure where first and second electrode leads 121 and 122 are asymmetrically formed. The battery cell 100 includes: a cell body 110 for accommodating an electrode assembly; a first electrode lead 121 which is formed in a manner that protrudes in one direction of the cell body 110; and a second electrode lead 122 which is formed in a manner that protrudes in a direction opposite to a direction in which the first electrode lead 121 of the cell body 110 is formed.

In the battery cell 100, the first electrode lead 121 is closer to the lower side, and the second electrode lead 122 is closer to the upper side. Specifically, the cell body 110 has a structure having shoulder lines 112 and 113, in which the heights of the shoulder lines 112 and 113 gradually decrease toward both external ends in the width direction, based on the first electrode lead 121. The shoulder lines 112 and 113 have a structure where the heights of the shoulder lines 112 and 113 gradually decrease in the external direction from the electrode lead. For example, referring to FIG. 3, the first electrode lead 121 is closer to the lower side. In this case, a relatively large dead space is created on the upper side as the shoulder line 112 is formed long, and a relatively small dead space is created on the lower side as the shoulder line 112 is formed short.

In the cell body 110, the ratio of lengths of the shoulder lines 112 and 113, which are formed at both sides of the first electrode lead 121 in the width direction, respectively, may be about 5:1. Further, in the cell body 110, the ratio of lengths of the shoulder lines, which are formed at both sides of the first electrode lead 122 in the width direction, respectively, may also be about 1:5. Likewise, in the battery cell 100 according to the present invention, it is possible to secure a larger area of a dead space by forming electrode leads 121 and 122 to be offset in a side surface direction. Further, the first electrode lead 121 and the second electrode lead 122 form an asymmetric structure by being offset in different side surface directions.

Second Embodiment

FIG. 4 is a schematic diagram showing a cross-section of a battery module according to another embodiment of the present invention. Referring to FIG. 4, the battery module 300 according to the present invention has a structure in which cell laminates 100, 200, which are obtained by lamination of a plurality of battery cells, are accommodated in module housings 301 and 302. The module housing includes a U-shaped frame, and a module housing upper plate 301 covering the upper surface of the U-shaped frame. FIG. 4 shows only a module housing lower plate 302 among U-shaped frames for the convenience of explanation.

The cell laminate has a structure where 2 battery cells 100 and 200 are disposed in the x-axis direction, and 24 battery cells are disposed in the y-axis direction (not shown). Therefore, 48 battery cells 100 and 200 are accommodated in the battery module 300. Referring to FIG. 4, each of the battery cells 100 stacked on the left side has the first electrode lead 121 at the left lower side, and the second electrode lead 122 at the right upper side. Further, each of the battery cells 200 stacked on the right side has the first electrode lead 221 at the left upper side, and the second electrode lead 222 at the right lower side.

Further, the battery module 300 has a reinforcing pole 400 which penetrates a space between the battery cells 100, 200 in order to reinforce the mechanical strength. The reinforcing pole 400 is arranged to penetrate the dead space between the battery cell 100 and the battery cell 200 arranged in the X-axis direction.

Specifically, in the battery module 300, the second electrode lead 122 of the first battery cell 100 disposed in the x-axis direction contact the first electrode lead 221 of the second battery cell 200 while facing each other, and the second electrode lead 122 and the first electrode lead 221 are electrically connected in series. In the first battery cell 100, the second electrode lead 122 is closer to the upper side, and in the second battery cell 200, the first electrode lead 221 is also closer to the upper side. In this case, the second electrode lead 122 of the first battery cell 100 and the first electrode lead 221 of the second battery cell 200 are electrically connected while facing each other at the same height, and a dead space of a large area is formed at the lower side. The reinforcing pole 400 penetrates through the dead space.

Likewise, the battery module 300 according to the present invention does not require an additional space for forming the reinforcing pole 400, and it is possible to simultaneously implement a high mechanical strength as well as excellent spatial utilization.

Third Embodiment

FIG. 5 is a schematic diagram showing a battery pack according to another embodiment of the present invention. Referring to FIG. 5, a battery pack 400 according to the present invention has a structure where 2 battery modules 310 and 320 are combined. Each of the battery modules 310 and 320 has a structure where 2 battery cells 100 and 200 are disposed in the x-axis direction, and 24 battery cells are disposed in the y-axis direction, and the battery cell 100 at the left side and the battery cell 200 at the right side are electrically connected in series. Further, the reinforcing pole 400, which penetrates the two battery modules 310 and 320, is fastened. The reinforcing pole 400 is disposed to penetrate the dead space between the battery cell 100 at the left side and the battery cell 200 at the right side, and the position of the reinforcing pole 400 is fixed by a reinforcing pole stopper 401.

Each of the battery modules 310 and 320 has a structure where its front and rear side surfaces and upper surface are covered by a U-shaped frame. It is possible to further include a lower plate (not shown) as necessary.

Although preferred examples of the present invention have been described with reference to drawings, it can be understood that those skilled in the art can make various modifications and changes to the present invention without departing from the spirit and scope of the invention as set forth in the claims below.

Therefore, the technical scope of the present invention should not be limited to the contents described in the detailed description of the specification but should be defined by the claims.

DESCRIPTION OF REFERENCE NUMERALS 10, 100, 200: battery cell
11, 110: cell body
12, 13, 112, 113: shoulder line
21, 121, 221: first electrode lead
22, 122, 222: second electrode lead
31, 32, 33, 34, 300, 310, 320: battery module
40: reinforcing bar
50, 500: battery pack
301: upper plate of module housing
302: lower plate of module housing
400: reinforcing pole
401: reinforcing pole stopper
$L_1$, $L_2$: length in width direction of shoulder line

The invention claimed is:

1. A battery module comprising:
a cell laminate obtained by lamination of a plurality of battery cells;
a housing for accommodating the cell laminate; and
a reinforcing pole which penetrates the battery cell laminate,
wherein each of the plurality of battery cells comprises a cell body for accommodating an electrode assembly, a first electrode lead protruding in a first direction of the cell body, and a second electrode lead in a second direction opposite to the first direction,
wherein the first electrode lead forms a first dead space on a first side surface of the cell body by being closer to a top side of the cell body, and
wherein the second electrode lead forms a second dead space on a second side surface by being closer to a bottom side of the cell body,
wherein the cell laminate has m battery cells arranged in an x-axis direction, and n battery cells arranged in a y-axis direction,
wherein the m is an integer of 2 or more, wherein the n is an integer of 2 or more, and
wherein the reinforcing pole penetrates a dead space between the battery cells arranged in the x-axis direction.

2. The battery module of claim 1, wherein the battery cells arranged in the x-axis direction have a second electrode lead of a p-th battery cell contact a first electrode lead of a (p+1)-th battery cell to thereby be electrically connected in series, and
wherein p is an integer which is equal to or greater than 1 and equal to or less than m−1.

3. The battery module of claim 2, wherein the reinforcing pole penetrates a dead space between a p-th battery cell and a (p+1)-th battery cell.

4. The battery module of claim 1, wherein the cell laminate has a structure in which 2 to 4 battery cells are arranged in the x-axis direction, and 10 to 30 battery cells are arranged in the y-axis direction.

5. The battery module of claim 1, wherein the housing has a receiving portion for accommodating the cell laminate and a through hole at each of side surfaces of the housing.

6. The battery module of claim 5, wherein a cross-section of the reinforcing pole has a circular or elliptical shape, and
wherein at least one stopper is formed on at least one of an inner side or an external side of one of the holes of the housing, through which the reinforcing pole penetrates.

7. The battery module of claim 5, wherein the housing includes:
a U-shaped frame including a receiving portion for accommodating the cell laminate, the through holes being formed at side surfaces of the U-shaped frame; and
a top plate which forms an upper surface of the U-shaped frame,
wherein the reinforcing pole penetrates the though holes.

8. The battery module of claim 5, wherein the housing includes:
a bottom plate which supports the cell laminate from a lower portion; and
a U-shaped frame which covers the cell laminate located on the bottom plate, the through holes being formed at side surfaces of the U-shaped frame,
wherein the reinforcing pole penetrates the though holes.

9. The battery module of claim 7, further comprising an end plate which forms at least one side surface of the U-shaped frame.

10. The battery module of claim 8, further comprising an end plate which forms at least one side surface of the U-shaped frame.

* * * * *